(12) United States Patent
Tong et al.

(10) Patent No.: US 12,366,514 B2
(45) Date of Patent: Jul. 22, 2025

(54) METHOD OF EVALUATING AEROSOL REMOVAL RATE BY STEAM CONDENSATION IN STEEL CONTAINMENT

(71) Applicant: SHANGHAI JIAO TONG UNIVERSITY, Shanghai (CN)

(72) Inventors: Lili Tong, Shanghai (CN); Peizheng Hu, Shanghai (CN); Xuewu Cao, Shanghai (CN)

(73) Assignee: SHANGHAI JIAO TONG UNIVERSITY, Shanghai (CN)

( * ) Notice: Subject to any disclaimer, the term of this patent is extended or adjusted under 35 U.S.C. 154(b) by 313 days.

(21) Appl. No.: 18/182,264

(22) Filed: Mar. 10, 2023

(65) Prior Publication Data

US 2023/0228664 A1 Jul. 20, 2023

Related U.S. Application Data

(63) Continuation of application No. PCT/CN2022/117314, filed on Sep. 6, 2022.

(51) Int. Cl.
*G01N 15/06* (2024.01)
*B01D 53/00* (2006.01)
*G01N 1/22* (2006.01)

(52) U.S. Cl.
CPC ........... *G01N 15/06* (2013.01); *B01D 53/002* (2013.01); *B01D 2257/70* (2013.01); *G01N 2001/2223* (2013.01)

(58) Field of Classification Search
CPC .............. G01N 15/06; G01N 15/2001; G01N 15/2223; G01N 15/04; B01D 53/002; B01D 2258/70; G21C 17/001
See application file for complete search history.

(56) References Cited

FOREIGN PATENT DOCUMENTS

CN 105597483 A * 5/2016

OTHER PUBLICATIONS

Sun et al., Study on Effect of Steam Condensation on Aerosol Diffusiophoresis in Severe Accident Condition, Atomic Energy Science and Technology, vol. 51, No. 1, pp. 73-78, Jan. 31, 2017 (Year: 2017).*

* cited by examiner

*Primary Examiner* — David Z Huang
(74) *Attorney, Agent, or Firm* — CBM PATENT CONSULTING, LLC

(57) ABSTRACT

A method of evaluating the aerosol removal rate by steam condensation, comprising: establishing the aerosol removal rate evaluation facility to perform the aerosol gravity settling experiment without steam and the comprehensive aerosol removal experiment with steam, so as to obtain aerosol mass concentration and particle size distribution in the experiments without steam and with steam condition respectively as calculation parameters; and then obtaining, by calculation, the relationship between the aerosol gravity settling rate and the particle size, aerosol mass concentration removed only by the gravity mechanism in the comprehensive aerosol removal experiment, aerosol mass concentration removed by steam condensation mechanism in the comprehensive aerosol removal experiment, and the aerosol removal rate by steam condensation in the comprehensive aerosol removal experiment.

7 Claims, 9 Drawing Sheets

S1 — Building a comprehensive test facility for aerosol removal rate evaluation to obtain the aerosol mass concentration and particle size distribution under different experimental conditions S2 — Caring out an aerosol gravity sedimentation experiment without steam, calculate the gravity sedimentation rate of different particle sizes, and obtain the gravity sedimentation rate calculation formula $V_g(d)$ by fitting S3 — Caring out an aerosol comprehensive sedimentation experiment with steam, and calculate the aerosol concentration change $C_{m,cg}(t_i)$ only caused by the gravity mechanism in the comprehensive experiment S4 — Calculating the aerosol concentration $C_{m,cs}(t_i)$ removed by the single steam condensation mechanism in the comprehensive experiment with steam S5 — Calculating the steam condensation removal rate $V_{cs}$ of aerosols in a comprehensive experiment with steam S1 — Building a comprehensive test facility for aerosol removal rate evaluation to obtain the aerosol mass concentration and particle size distribution under different experimental conditions S2 — Caring out an aerosol gravity sedimentation experiment without steam, calculate the gravity sedimentation rate of different particle sizes, and obtain the gravity sedimentation rate calculation formula $V_g(d)$ by fitting S3 — Caring out an aerosol comprehensive sedimentation experiment with steam, and calculate the aerosol concentration change $C_{m,cg}(t_i)$ only caused by the gravity mechanism in the comprehensive experiment S4 — Calculating the aerosol concentration $C_{m,cs}(t_i)$ removed by the single steam condensation mechanism in the comprehensive experiment with steam S5 — Calculating the steam condensation removal rate $V_{cs}$ of aerosols in a comprehensive experiment with steam

Fig. 1

METHOD OF EVALUATING AEROSOL REMOVAL RATE BY STEAM CONDENSATION IN STEEL CONTAINMENT

CROSS-REFERENCE TO RELATED APPLICATIONS

This application is the U.S. continuation application of International Application No. PCT/CN2022/117314 filed on 6 Sep. 2022 which designated the U.S. and claims priority to Chinese Application No. CN202111536435.4 filed on 15 Dec. 2021, the entire contents of each of which are hereby incorporated by reference.

TECHNICAL FIELD

The invention relates to a technology in the field of nuclear safety, in particular to a method of evaluating aerosol removal rate by steam condensation in the steel containment.

BACKGROUND ART

The external cooling measure for a steel containment is a special passive safety measure adopted by AP series advanced generation III nuclear power plants. A large amount of high-temperature steam and radioactive aerosols are released into the containment during accident. Running the external cooling measure can not only lead out the heat to prevent overpressure failures of the containment, but also remove the radioactive aerosols and reduce radioactive leakage. The suspended aerosol will naturally settle under gravity, but the effect of gravity settling is highly related to the particle size, and the removal effect on submicron particles is poor. Under the condition of running the containment external cooling system, particles of different sizes will be removed by steam condensation. Therefore, estimating the aerosol removal rate by steam condensation under the condition of external cooling of the steel containment is of great significance for radioactive source item evaluation and safety analysis of nuclear power plants.

The evaluation of the aerosol removal rate in the containment under the accident condition has always been an important research topic in safety analysis of nuclear power plants. Steam condensation is an important physical phenomenon in containment under the accident condition, and is also one of the important mechanisms of aerosol removal. Since 1980s, theoretical models based on the simplified assumptions have been used for analysis. However, under the real condition of external cooling, the environment inside the containment is complicated, and the comprehensive effect of steam condensation on aerosol removal is strong, which leads to great uncertainty in the analysis results of the current model.

SUMMARY OF THE INVENTION

Aiming at the above shortcomings in the prior art, the invention proposes a method of evaluating aerosol removal rate by steam condensation, which simulates the aerosol removal process under the real condition of external cooling of a steel containment, comprehensively considers the removal effects of gravity and steam condensation, separates the gravity removal effect from the comprehensive effect, and further evaluates the aerosol removal rate by steam condensation in the steel containment with running the external cooling measure.

The invention is realized by the following technical scheme.

The invention relates to a method of evaluating the aerosol removal rate by steam condensation, comprising: establishing the aerosol removal rate evaluation facility to perform the aerosol gravity settling experiment without steam and the comprehensive aerosol removal experiment with steam, so as to obtain aerosol mass concentration and particle size distribution in the experiments without steam and with steam condition respectively as calculation parameters; and then obtaining, by calculation, the relationship between the aerosol gravity settling rate and the particle size, aerosol mass concentration removed only by the gravity mechanism in the comprehensive aerosol removal experiment, aerosol mass concentration removed by steam condensation mechanism in the comprehensive aerosol removal experiment, and the aerosol removal rate by steam condensation in the comprehensive aerosol removal experiment.

The aerosol removal rate by steam condensation of aerosols can be directly applied to concentration attenuation calculation, which represents the removal efficiency, that is, an attenuation curve can be obtained according to the aerosol removal rate of steam condensation obtained by experimental means and mathematical treatment.

The evaluation facility composed by the medium injection system, the external cooling system and the parameter measurement system connected with the container.

The aerosol gravity settling experiment without steam refers to an experiment in which in an airtight container without steam, aerosols naturally settle to the bottom of the container under gravity only, so that the suspended aerosols are removed; and in the gravity settling experiment, the aerosol mass concentration $C_{m,g}(t_i)$ and the particle size distribution $dC_{m,j}/C_m$ at $t_i$ are measured online by using an aerosol spectrometer.

The relationship between the gravity settling rate and the aerosol particle size refers to calculate the gravity settling rate $$V_{g,d_j} = -\frac{V}{A_g} \cdot \frac{C_{m,g}(t_1) \cdot dC_{m,j}/C_m - C_{m,g}(t_0) \cdot dC_{m,j}/C_m}{\int_{t_0}^{t_1} C_{m,g}(t) \cdot dC_{m,j}/C_m dt}$$

corresponding to aerosol with different sizes in the current particle group, where V is the volume of the container and $A_g$ is the gravity deposition area; further, the second-order polynomial fitting is performed on $V_{g,d_j}$ and $d_j$ to obtain the relationship between the aerosol gravity settling rate and the particle size, $V_g(d) = a + b \cdot d + c \cdot d^2$.

The comprehensive aerosol removal experiment with steam refers to an experiment in which in the airtight container with high-temperature steam, the external cooling system of the container is turned on, and aerosols are deposited on the bottom and cooling walls of the container by the simultaneous effect of gravity and steam condensation, so that the suspended aerosols are removed; and in the comprehensive aerosol removal experiment, the aerosol mass concentration of $C_{m,c}(t_i)$ and the particle size distribution $dC_{m,k}/C_m$ at $t_i$ are measured online by using an aerosol spectrometer.

The aerosol removed by the gravity mechanism in the comprehensive aerosol removal experiment refers to obtain the aerosol mass concentration $C_{m,cg}(t_i) = C_{m,c}(t_i)$.

$$\left(1 - \frac{A_g}{V} \cdot V_g(d_k) \cdot (t_i - t_{i-1})\right)$$

attenuated only by gravity settling which separated from the comprehensive aerosol removal experiment.

The aerosol removed by the steam condensation mechanism in the comprehensive aerosol removal experiment refers to obtain the aerosol mass concentration $C_{m,cs}(t_i)= C_{m,c}(t_0)+C_{m,c}(t_i)-C_{m,cg}(t_i)$ attenuated by the steam condensation mechanism in the comprehensive aerosol removal experiment.

The aerosol removal rate by steam condensation in the comprehensive aerosol removal experiment refers to obtain the aerosol removal rate by steam condensation of aerosols $$V_{cs} = -\frac{V}{A_{cs}} \cdot \frac{C_{m,cs}(t_1) - C_{m,cs}(t_0)}{\int_{t_0}^{t_1} C_{m,cs}(r)dt}$$

under the condition of external cooling of the steel containment, where $A_{cs}$ is the area of a condensation wall.

Technical Effects

Compared with the prior art, the invention recreates the real external cooling process of a steel containment by carrying out a comprehensive aerosol removal experiment with steam, and calculates the relationship between the gravity settling rate and the particle size, aerosol concentration removed only by the gravity mechanism in the comprehensive aerosol removal experiment, aerosol mass concentration removed by steam condensation mechanism in the comprehensive aerosol removal experiment, and the aerosol removal rate by steam condensation in the comprehensive aerosol removal experiment.

BRIEF DESCRIPTION OF THE DRAWINGS

FIG. 1 is a flowchart of the invention.

Figure 2:
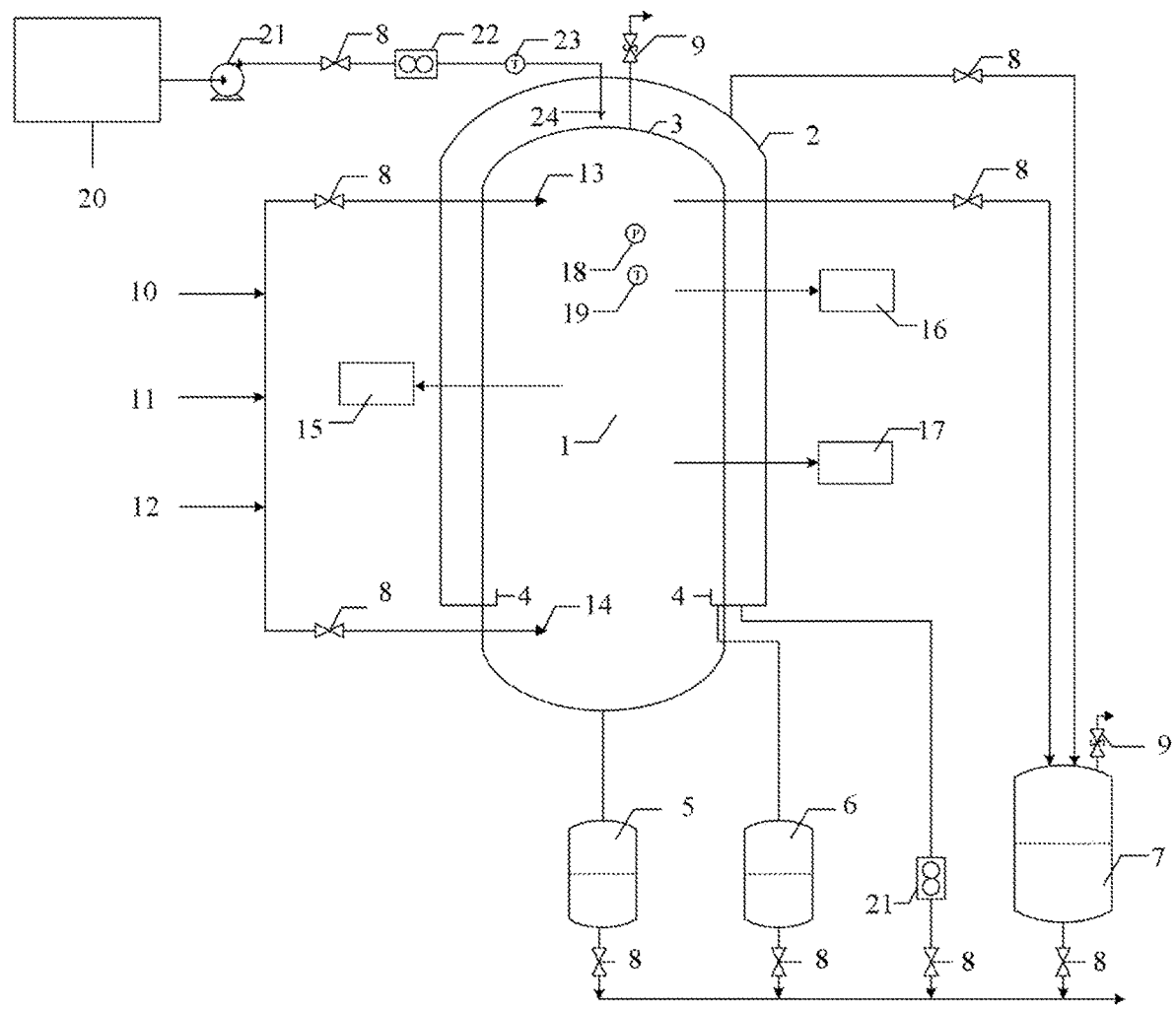
FIG. 2 is a diagram of an aerosol removal rate evaluation facility according to an embodiment of the invention.
Figure 3:
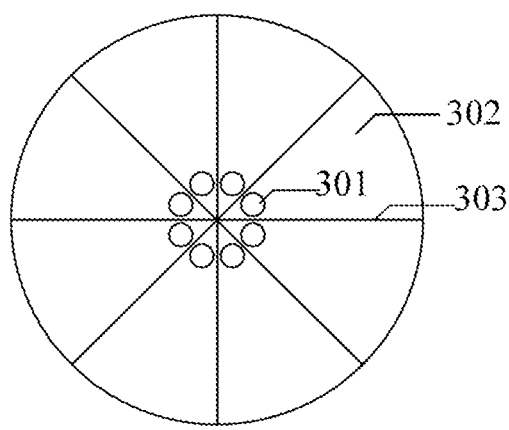
FIG. 3 is a diagram of a cooling water partition flow channel at the top of the interlayer.
Figure 4:
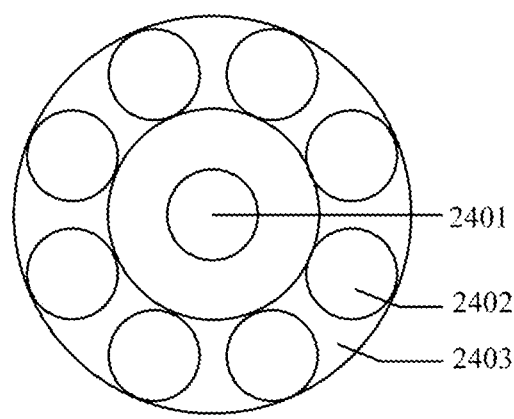
FIG. 4 is a top view of a cooling water diverter.
Figure 5:
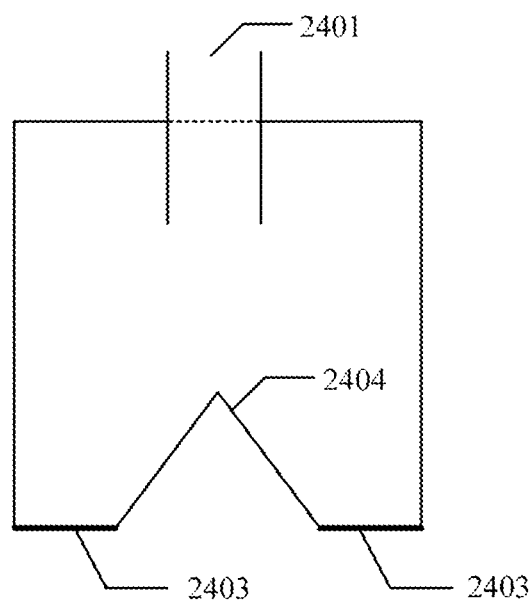
FIG. 5 is a front view of a cooling water diverter.

In the figures: 1, airtight pressure container; 2, cooling water interlayer; 3, cooling water partition flow channel at the top of the interlayer; 4, wall cooling water channel; 5, space condensate collection tank; 6, wall condensate collection tank; 7, waste gas tank; 8, gate valve; 9, safety valve; 10, air injection pipeline; 11, water steam injection pipeline; 12, aerosol injection pipeline; 13, upper injection port of the container; 14, lower injection port of the container; 15, steam concentration sensor; 16, upper measuring point of the aerosol spectrometer; 17, lower measuring point of the aerosol spectrometer; 18, pressure sensor; 19, temperature sensor; 20, cooling water tank; 21, cooling water pump; 22, cooling water flowmeter; 23, cooling water thermometer; 24, cooling water diverter; 301, inlet of cooling water partition flow channel at the top of the interlayer; 302, fan-shaped curved flow channel; 303, flow channel partition; 2401, inlet of cooling water diverter; 2402, outlet of cooling water diverter; 2403, annular subchannel; 2404, conical convex surface.

DETAILED DESCRIPTION OF THE INVENTION

Figure 6:
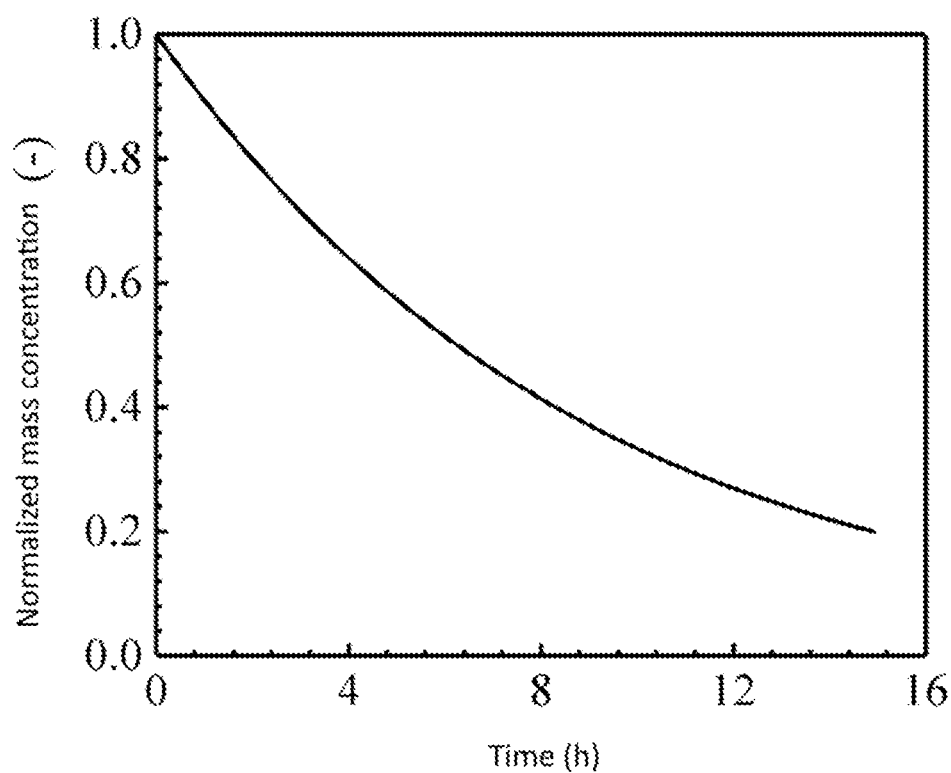
FIG. 6 shows the variation of normalized aerosol mass concentration in the gravity settling experiment without steam.
Figure 7:
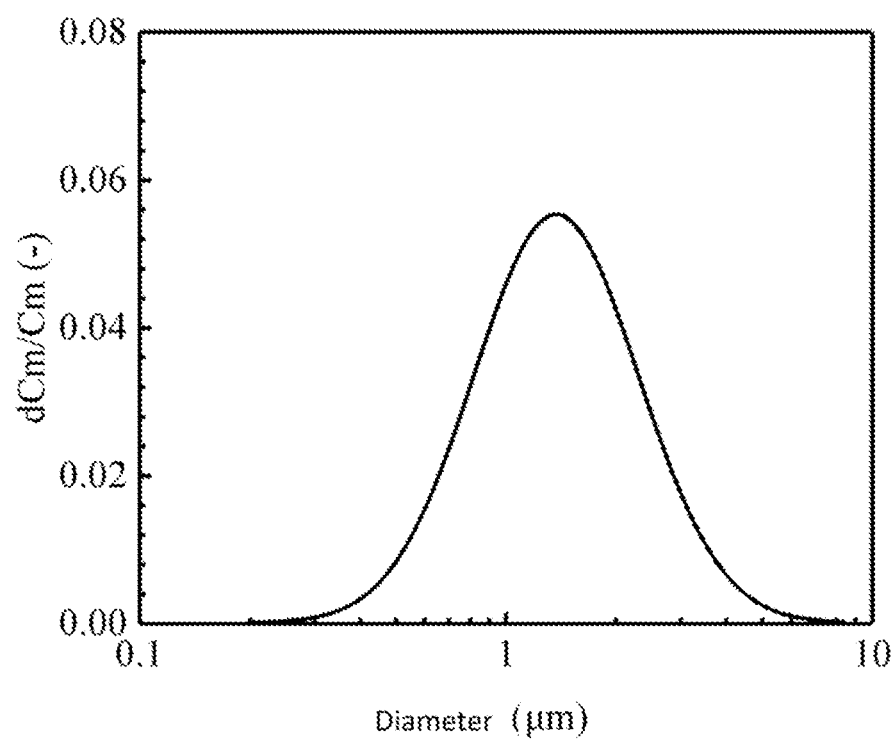
FIG. 7 shows the initial particle size distribution in the gravity settling experiment without steam.
Figure 8:
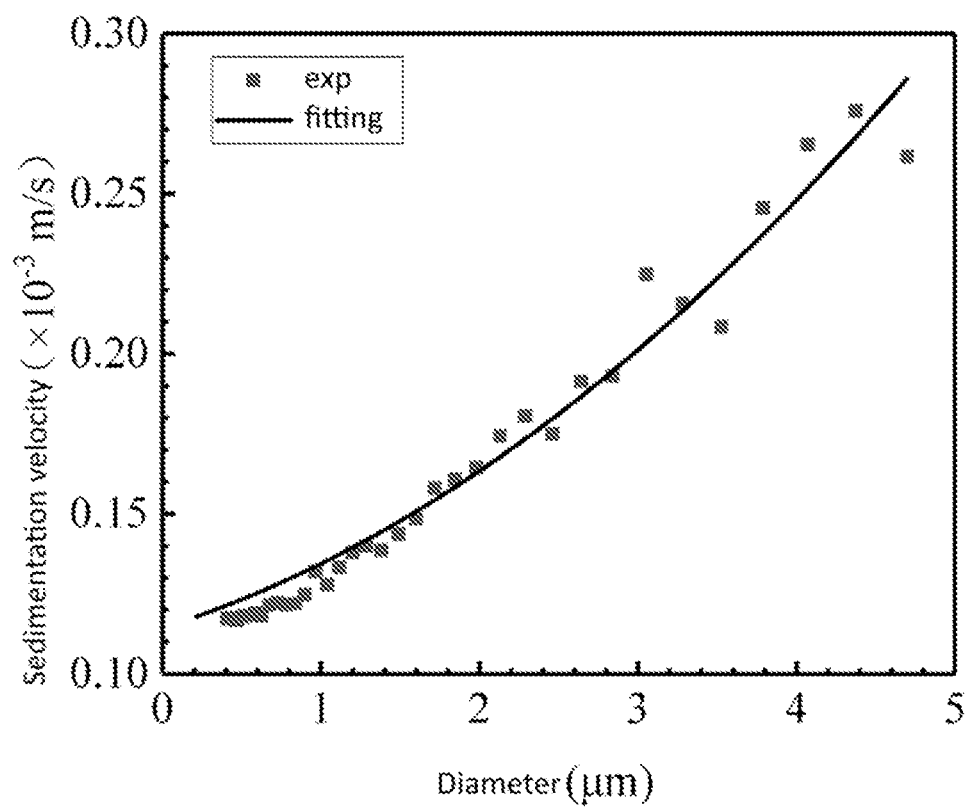
FIG. 8 is a fitting curve of the relationship between the gravity settling rate and the particle size.
Figure 9:
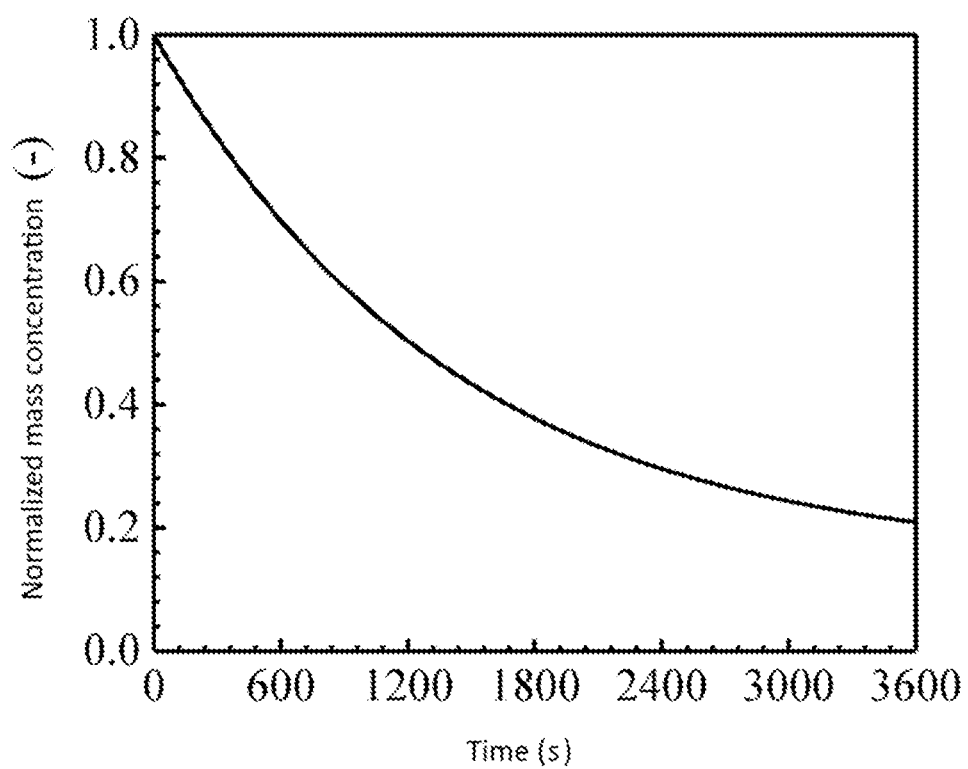
FIG. 9 shows the variation of normalized aerosol mass concentration in the comprehensive aerosol removal experiment with steam.
Figure 10:
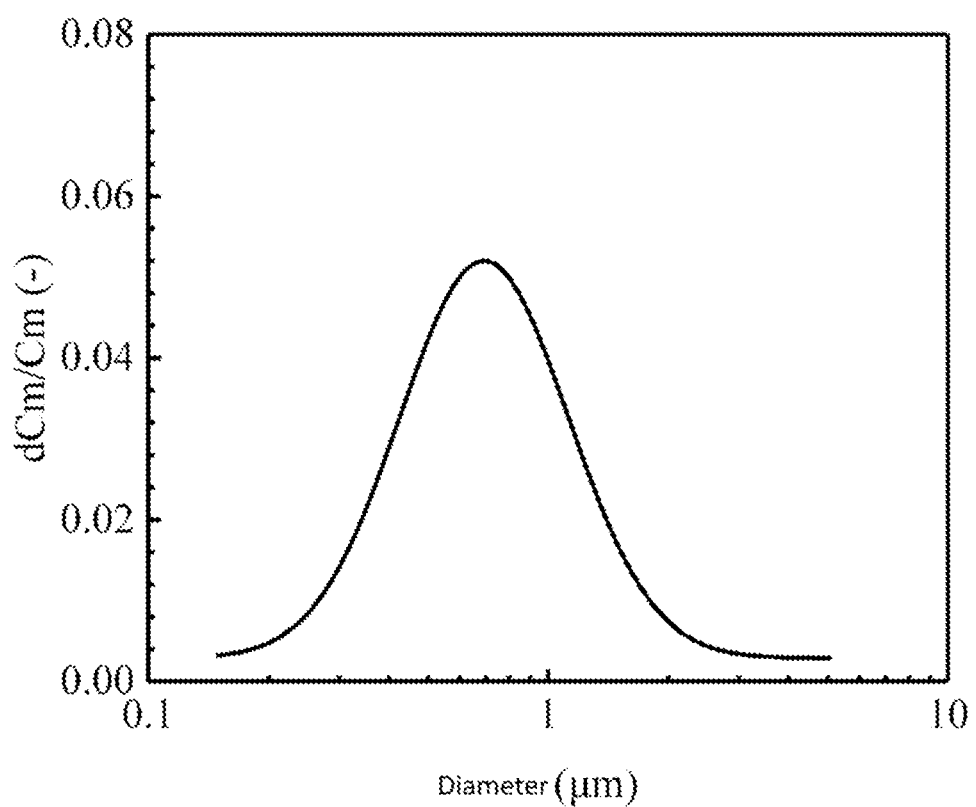
FIG. 10 shows the initial particle size distribution in the comprehensive aerosol removal experiment with steam.
Figure 11:
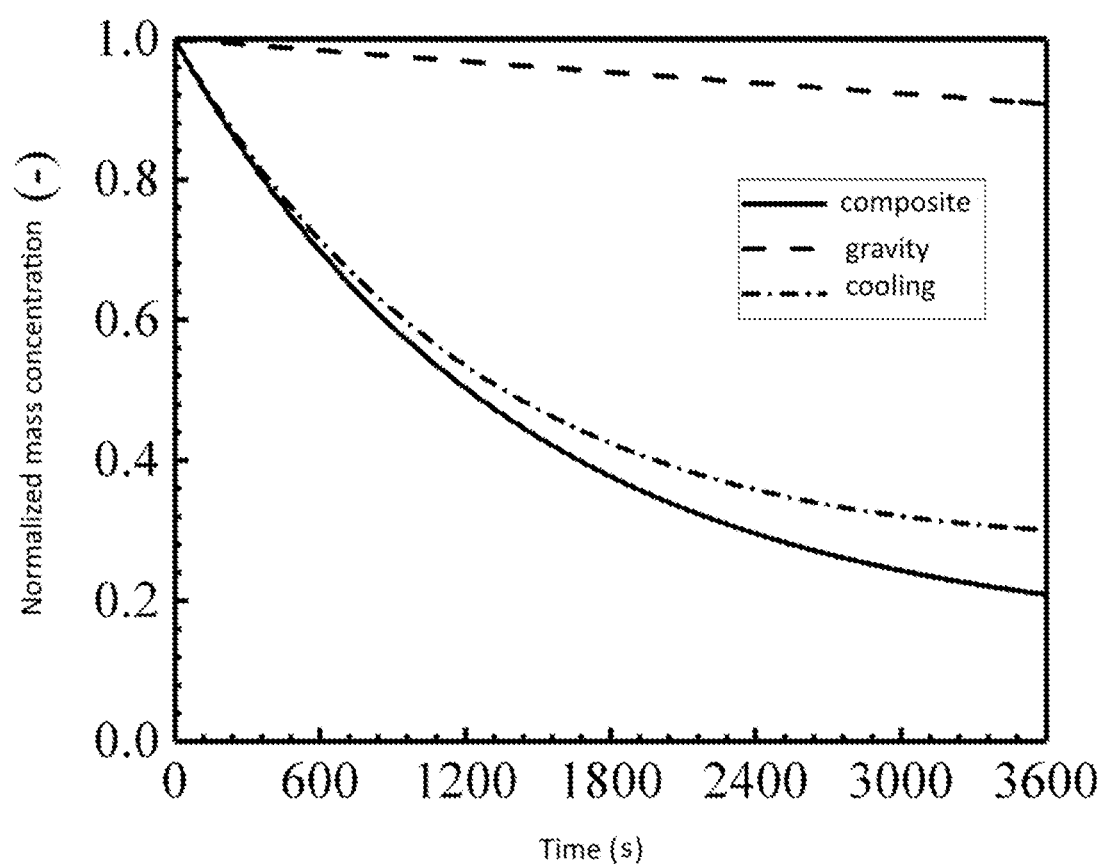
FIG. 11 shows the variation of normalized aerosol mass concentration corresponding to comprehensive removal, gravity removal and steam condensation removal in the comprehensive aerosol removal experiment with steam.

As shown in FIG. 1, a method for evaluating the aerosol removal rate by steam condensation of aerosols under the external cooling condition in this embodiment comprises the following steps:

S1, setting up a comprehensive removal test facility for aerosol removal rate evaluation to obtain the mass concentration and particle size distribution of suspended aerosols in the experimental process, the test facility comprising an experimental body, and a medium injection system, an external cooling system and a parameter measurement system connected with the experimental body;

wherein the experimental body comprises an airtight pressure container 1, a cooling water sandwich layer 2 arranged on an outer wall of the pressure container 1, and 8 cooling water partition flow channels 3 located on the top of the pressure container 1, and 8 cooling water partition flow channels 3 are uniformly arranged to ensure that cooling water uniformly covers the outer wall of the container to achieve uniform cooling;

the volume of the pressure container 1 is 18.5 m$^3$;

the medium injection system comprises an air injection pipeline 10, a water steam injection pipeline 11 and an aerosol injection pipeline 12, which are respectively used to inject clean air, high-temperature water steam and polydisperse aerosols into the airtight pressure container 1, and the injection system can monitor the thermal parameters of the experiment together with the parameter measurement system, so as to meet the experimental requirement of simulating the accident environment with high temperature, high pressure and high water steam share;

the external cooling system comprises a cooling water tank 20, a cooling water pump 21, a valve, a flowmeter, a temperature sensor and a cooling water diverter 24 which are connected in sequence, and the cooling water diverter is connected with the cooling water partition flow channel on the top of the sandwich layer;

the parameter measurement system comprises particle size spectrometers 16 and 17, a temperature sensor 19, a pressure sensor 18, a water steam concentration sensor 15, a cooling water flowmeter 22 and a cooling water thermometer 23, the particle size spectrometer is used to measure mass concentration and particle size distribution of suspended aerosols, the water steam concentration sensor is used to evaluate the steam condensation rate, and the temperature and pressure sensors are used to determine the thermal-hydraulic state of the containment, so as to realize the accident condition featuring high temperature, high pressure and high water steam share;

carrying out an aerosol gravity settling experiment without steam, measuring the aerosol mass concentration $C_{m,g}(t_i)$ and the particle size distribution $dC_{m,j}/C_m$ at $t_i$ by using an aerosol spectrometer S2, carrying out an aerosol gravity settling experiment without steam, measuring the mass concentration of aerosols $C_{m,g}(t_i)$ and the particle size distribution $dC_{m,j}/C_m$ at $t_i$ by using an aerosol spectrometer corresponding to the particle size $d_j$, calculating the gravity settling rate of aerosols with different particle sizes, and further fitting the data to obtain the expression of the gravity settling rate; wherein specifically, the aerosol gravity settling experiment without steam is performed, and the total duration of the experiment is 15 hours; in this experiment, the change of mass concentration $C_{m,g}(t_i)$ of aerosols with time after normalization measured by the particle size spectrometer in real time at $t_i$ is shown in FIG. 6, and the measured initial particle size distribution of aerosols is shown in FIG. 7, where the measured mass median diameter MMD of aerosols was 1.36 μm, the geometric standard deviation GSD=1.65, the gravity settling rate of aerosol particles with different particle sizes $$V_{g,d_j} = -\frac{V}{A_g} \cdot \frac{C_{m,g}(t_1) \cdot dC_{m,j}/C_m - C_{m,g}(t_0) \cdot dC_{m,j}/C_m}{\int_{t_0}^{t_1} C_{m,g}(t) \cdot dC_{m,j}/C_m dt}$$

is calculated according to the measured aerosol mass concentration $C_{m,g}(t_i)$ and particle size distribution, and the functional relationship between the gravity settling rate and the particle size $V_g(d)=a+b\cdot d+c\cdot d^2$ is obtained by fitting, as shown in FIG. 8, where a=1.144E-4, b=1.564E-5, and c=4.339E-6;

S3, carrying out a comprehensive aerosol removal experiment with steam, measuring the mass concentration of aerosols $C_{m,c}(t_i)$ and the particle size distribution $dC_{m,k}/C_m$ at $t_i$ by using an aerosol spectrometer, corresponding to the particle size $d_k$, and calculating the variation of aerosol concentration caused by the single gravity mechanism in the comprehensive aerosol removal experiment; wherein specifically, the comprehensive aerosol removal experiment with steam is performed, and the total duration of the experiment is 1 hour; in this experiment, the measured and normalized aerosol mass concentration $C_{m,c}(t_i)$ is shown in FIG. 9, and the measured initial particle size distribution of aerosols is shown in FIG. 10, where the mass median diameter MMD was 0.75 μm, and the geometric standard deviation GSD is 1.63; wherein according to the functional expression $V_g(d)$ obtained in S2, the aerosol concentration change $$C_{m,cg}(t_i) = C_{m,c}(t_i) \cdot \left(1 - \frac{A_g}{V} \cdot V_g(d_k) \cdot (t_i - t_{i-1})\right)$$

caused by the single gravity removal mechanism in the comprehensive aerosol removal experiment with steam is calculated, and the change with time after normalization is shown by the gravity removal curve in FIG. 11;

S4, calculating the aerosol concentration removed by the steam condensation mechanism in the comprehensive aerosol removal experiment with steam; wherein specifically, the aerosol concentration $C_{m,cs}(t_i)=C_{m,c}(t_0)+C_{m,c}(t_i)-C_{m,cg}(t_i)$ removed by the steam condensation mechanism in the comprehensive aerosol removal experiment with steam is calculated according to the aerosol concentration parameter $C_{m,cg}(t_i)$ removed by the single gravity mechanism obtained in S3, and the concentration variation after normalization is shown by the condensation removal curve in FIG. 11; after the external cooling measure is adopted for the steel containment, 87.5% of aerosol removal is realized by steam condensation in 1 hour, and the removal efficiency of steam condensation is about 7 times that of gravity sedimentation;

S5, calculating the aerosol removal rate by steam condensation of aerosols in the comprehensive aerosol removal experiment with steam; wherein specifically, the aerosol removal rate by steam condensation of aerosols $$V_{cs} = -\frac{V}{A_{cs}} \cdot \frac{C_{m,cs}(t_1) - C_{m,cs}(t_0)}{\int_{t_0}^{t_1} C_{m,cs}(t) dt}$$

under the condition of external cooling of the steel containment is calculated according to the aerosol mass concentration $C_{m,cs}(t_i)$ removed by the single steam condensation mechanism obtained in S4.

In a practical experiment with the accident condition, that is, a steel containment contained high-temperature steam, that is, the steam share is 35%, running the external cooling measure, the cooling water flow rate is 2.0 m³/h, the aerosol mass concentration $C_{m,c}(t_i)$ of aerosols and the particle size distribution $dC_{m,k}/C_m$ are measured, and finally the aerosol removal rate by steam condensation $V_{cs}$ in different time periods under this condition can be obtained, as shown in FIG. 11. According to the experimental and calculation results, the aerosol mass concentration decreased by 80% in 1 hour, 70% of the aerosol is removed by the steam condensation mechanism and 10% by the gravity sedimentation mechanism. The removal efficiency of steam condensation is much higher than that of gravity sedimentation, accounting for 87.5%, and the removal efficiency is about 7 times that of gravity sedimentation. This method can be used to evaluate the aerosol removal rate by steam condensation in a steel containment under accident conditions.

Compared with the prior art, the invention simulates the complex thermal-hydraulic environment in a containment and the steam condensation process under the accident condition by carrying out a gravity deposition experiment without steam and a comprehensive deposition experiment with steam, and finally, the aerosol removal rate by steam condensation under the accident condition is obtained through experimental parameter measurement and mathematical analysis and calculation, which is closer to the actual situation.

The above specific implementation can be partially adjusted by those skilled in the art in different ways without departing from the principle and purpose of the invention. The scope of protection of the invention is subject to the claims and is not limited by the above specific implementation, and each implementation scheme within its scope is bound by the invention.

What is claimed is:

1. A method of evaluating aerosol removal rate by steam condensation, comprising: establishing an aerosol removal rate evaluation facility to perform an aerosol gravity settling experiment without steam and a comprehensive aerosol removal experiment with steam, so as to obtain aerosol mass concentration and particle size distribution in the experiments without steam and with steam condition respectively as calculation parameters; and then obtaining a relationship between an aerosol gravity settling rate and a particle size, aerosol mass concentration removed only by a gravity mechanism in the comprehensive aerosol removal experiment, aerosol mass concentration removed by a steam condensation mechanism in the comprehensive aerosol removal experiment, and the aerosol removal rate by steam condensation in the comprehensive aerosol removal experiment;

wherein said relationship between the aerosol gravity settling rate and the particle size is obtained by calculating the gravity settling rate $$V_{g,d_j} = -\frac{V}{A_g} \cdot \frac{C_{m,g}(t_1) \cdot dC_{m,j}/C_m - C_{m,g}(t_0) \cdot dC_{m,j}/C_m}{\int_{t_0}^{t_1} C_{m,g}(t) \cdot dC_{m,j}/C_m dt}$$

corresponding to aerosol with different sizes in a current particle group, where V is a volume of an airtight container, $A_g$ is a gravity deposition area, $C_{m,g}(t_i)$ is the aerosol mass concentration and $dC_{m,j}/C_m$ is the particle size distribution and further performing second-order polynomial fitting on $V_{g,d_j}$ and $d_j$, then obtaining the relationship between the aerosol gravity settling rate and the particle size, $V_g(d)=a+b\cdot d+c\cdot d^2$.

2. The method of evaluating aerosol removal rate by steam condensation according to claim 1, wherein said aerosol gravity settling experiment without steam is an experiment in which in an airtight container without steam, aerosols naturally settle to the bottom of the container under gravity only, so that suspended aerosols are removed; and in the gravity settling experiment, the aerosol mass concentration $C_{m,g}(t_i)$ and the particle size distribution $dC_{m,j}/C_m$ at $t_i$ are measured online by using an aerosol spectrometer.

3. The method of evaluating aerosol removal rate by steam condensation according to claim 1, wherein said comprehensive aerosol removal experiment with steam is an experiment in which in an airtight container with high-temperature steam, an external cooling system of the container is turned on, and aerosols are deposited on the bottom and cooling walls of the container by the simultaneous effect of gravity and steam condensation, so that suspended aerosols are removed; and in the comprehensive aerosol removal experiment, the aerosol mass concentration of $C_{m,c}(t_i)$ and the particle size $d_k$ with distribution of $dC_{m,k}/C_m$ at $t_i$ are measured online by using an aerosol spectrometer.

4. The method of evaluating aerosol removal rate by steam condensation according to claim 1, wherein said aerosol mass concentration removed only by the gravity mechanism in the comprehensive aerosol removal experiment is obtained by calculating the aerosol mass concentration $$C_{m,cg}(t_i) = C_{m,c}(t_i) \cdot \left(1 - \frac{A_g}{V} \cdot V_g(d_k) \cdot (t_i - t_{i-1})\right)$$

attenuated only by gravity settling which separated from the comprehensive aerosol removal experiment.

5. The method of evaluating aerosol removal rate by steam condensation according to claim 1, wherein said aerosol mass concentration removed by the steam condensation mechanism in the comprehensive aerosol removal experiment is obtained by calculating the aerosol mass concentration $C_{m,cs}(t_i)=C_{m,c}(t_0)+C_{m,c}(t_i)-C_{m,cg}(t_i)$ attenuated by the steam condensation mechanism in the comprehensive aerosol removal experiment.

6. The method of evaluating aerosol removal rate by steam condensation according to claim 1, wherein said the aerosol removal rate by steam condensation in the comprehensive aerosol removal experiment is obtained by calculating the aerosol removal rate by steam condensation of aerosols $$V_{cs} = -\frac{V}{A_{cs}} \cdot \frac{C_{m,cs}(t_1) - C_{m,cs}(t_0)}{\int_{t_0}^{t_1} C_{m,cs}(t) dt}$$

under the condition of external cooling of a steel containment, where $A_{cs}$ is the area of a condensation wall.

7. The method of evaluating aerosol removal rate by steam condensation according to claim 1, specifically comprising:

S1, establishing a comprehensive aerosol removal rate evaluation facility to obtain the aerosol mass concentration and particle size distribution during experimental process, the evaluation facility comprising a container, and a medium injection system, an external cooling system and a parameter measurement system connected with the container;

S2, carrying out an aerosol gravity settling experiment without steam, measuring the aerosol mass concentration $C_{m,g}(t_i)$ and the particle size distribution $dC_{m,j}/C_m$ at $t_i$ by using an aerosol spectrometer, and further fitting the data to obtain the expression of the gravity settling rate; wherein specifically, the aerosol gravity settling experiment without steam is performed, the total duration of the experiment is 15 hours, the measured mass median diameter MMD of aerosols is 1.36 μm, the geometric standard deviation GSD is 1.65, the aerosol gravity settling rate with different particles $$V_{g,d_j} = -\frac{V}{A_g} \cdot \frac{C_{m,g}(t_1) \cdot dC_{m,j}/C_m - C_{m,g}(t_0) \cdot dC_{m,j}/C_m}{\int_{t_0}^{t_1} C_{m,g}(t) \cdot dCm_j/C_m dt}$$

is calculated according to the measured aerosol mass concentration $C_{m,g}(t_i)$ and particle size distribution $dC_{m,j}/C_m$, and the relationship between the gravity settling rate and the particle size $V_g(d)=a+b\cdot d+c\cdot d^2$ is obtained by fitting, wherein a=1.144E-4, b=1.564E-5, and c=4.339E-6;

S3: carrying out a comprehensive aerosol removal experiment with steam, measuring the aerosol mass concentration of aerosols $C_{m,c}(t_i)$ and the particle size distribution of aerosol particles at $t_i$ in real time by using a particle size spectrometer, that is, the shared $C_{m,k}/C_m$ corresponding to the particle size $d_k$, and calculating the aerosol concentration change caused by the single gravity mechanism in the comprehensive aerosol removal experiment; wherein specifically, the comprehensive aerosol removal experiment with steam is performed, the total duration of the experiment is 1 hour, the measured mass median diameter MMD of aerosols is 0.75 μm, the geometric standard deviation GSD=1.63, and the aerosol mass concentration $$C_{m,cg}(t_i) = C_{m,c}(t_i) \cdot \left(1 - \frac{A_g}{V} \cdot V_g(d_k) \cdot (t_i - t_{i-1})\right)$$

attenuated only by gravity in the comprehensive aerosol removal experiment with steam is calculated according to the expression $V_g(d)$ obtained in S2;

S4, calculating the aerosol mass concentration removed by the steam condensation mechanism in the comprehensive aerosol removal experiment with steam; wherein specifically, the aerosol mass concentration $C_{m,cs}(t_i)=C_{m,c}(t_0)+C_{m,c}(t_i)-C_{m,cg}(t_i)$ removed by the steam condensation mechanism in the comprehensive aerosol removal experiment with steam is calculated according to the aerosol mass concentration $C_{m,cg}(t_i)$ obtained in S3;

S5, calculating the aerosol removal rate by steam condensation of aerosols in the comprehensive aerosol removal experiment with steam; wherein specifically, the aerosol removal rate by steam condensation $$V_{cs} = -\frac{V}{A_{cs}} \cdot \frac{C_{m,cs}(t_1) - C_{m,cs}(t_0)}{\int_{t_0}^{t_1} C_{m,cs}(t)dt}$$

under the condition of external cooling of the container is calculated according to the aerosol mass concentration $C_{m,cs}(t_i)$ removed by the steam condensation mechanism obtained in S4.

* * * * *